United States Patent
Nakajima et al.

(10) Patent No.: US 10,119,673 B2
(45) Date of Patent: Nov. 6, 2018

(54) VEHICLE LIGHTING DEVICE FOR ILLUMINATING IN A FIRST AND SECOND DIRECTION

(71) Applicant: Stanley Electric Co., Ltd., Tokyo (JP)

(72) Inventors: Kazuho Nakajima, Kanagawa (JP); Yosuke Fuseya, Kanagawa (JP); Takashi Abe, Kanagawa (JP); Shosuke Shimoda, Aichi (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 81 days.

(21) Appl. No.: 15/257,236

(22) Filed: Sep. 6, 2016

(65) Prior Publication Data
US 2017/0089541 A1    Mar. 30, 2017

(30) Foreign Application Priority Data

Sep. 25, 2015  (JP) .................. 2015-187970

(51) Int. Cl.
| | |
|---|---|
| *F21S 43/40* | (2018.01) |
| *B60Q 1/22* | (2006.01) |
| *F21S 43/14* | (2018.01) |
| *F21S 43/239* | (2018.01) |
| *F21S 43/241* | (2018.01) |
| *F21S 43/243* | (2018.01) |
| *F21S 43/247* | (2018.01) |
| *F21S 43/31* | (2018.01) |
| *F21S 45/47* | (2018.01) |

(52) U.S. Cl.
CPC ............. *F21S 43/40* (2018.01); *B60Q 1/22* (2013.01); *F21S 43/14* (2018.01); *F21S 43/239* (2018.01); *F21S 43/241* (2018.01); *F21S 43/243* (2018.01); *F21S 43/247* (2018.01); *F21S 43/31* (2018.01); *F21S 43/315* (2018.01); *F21S 45/47* (2018.01)

(58) Field of Classification Search
CPC ....... B60Q 1/22; F21S 48/1311; F21S 41/395; F21S 43/20–43/251; F21S 43/315; F21S 43/40
See application file for complete search history.

(56) References Cited

U.S. PATENT DOCUMENTS

2015/0055362 A1*  2/2015 Noritake ................. F21S 48/24
                                                          362/516

FOREIGN PATENT DOCUMENTS

JP       2014-203591 A    10/2014

* cited by examiner

*Primary Examiner* — Anh Mai
*Assistant Examiner* — Michael Chiang
(74) *Attorney, Agent, or Firm* — Kenealy Vaidya LLP

(57) ABSTRACT

A vehicle lighting device includes a light source and a light guiding lens guiding light from the light source to make the light exit from a light exit in a front part thereof. The light exit of the light guiding lens includes a first light exit surface through which the light is made to exit in a first illuminating direction and a second light exit surface disposed adjacent to the first light exit surface in a front view and through which the light is made to exit in a forward direction. A reflector is disposed in front of the second light exit surface such that the reflector covers the second light exit surface and reflects the light, which is made to exit through the second light exit surface, in a second illuminating direction different from the first illuminating direction.

16 Claims, 4 Drawing Sheets

III-III CROSS SECTION

BACK: FORWARD OF VEHICLE

RIGHT ←→ LEFT

FRONT: BACKWARD OF VEHICLE

IV-IV CROSS SECTION

BACK: FORWARD OF VEHICLE ← UP ↑ ↓ DOWN → FRONT: BACKWARD OF VEHICLE

ENLARGED VIEW OF PORTION B

BACK: FORWARD OF VEHICLE ← UP ↑ ↓ DOWN → FRONT: BACKWARD OF VEHICLE

VEHICLE LIGHTING DEVICE FOR ILLUMINATING IN A FIRST AND SECOND DIRECTION

CROSS REFERENCE TO RELATED APPLICATION

This application is based upon and claims the benefit of priority under 35 USC 119 of Japanese Patent Application No. 2015-187970 filed on Sep. 25, 2015, the entire disclosure of which, including the description, claims, drawings and abstract, is incorporated herein by reference in its entirety.

BACKGROUND OF THE INVENTION

1. Field of the Invention

The present invention relates to a vehicle lighting device to be mounted on a vehicle, particularly to a technology of illuminating two different directions with a light guiding lens.

2. Description of the Related Art

A traditional vehicle lighting device to be mounted on a vehicle includes a single lens for achieving a primary light distribution (a base light distribution) in the forward direction of the lighting device and a secondary light distribution in a direction different from the forward direction of the lighting device (See Japanese Patent Laid-Open No. 2014-203591, for example).

As shown in FIGS. 5A and 5B, a back lamp for illuminating the backward direction of the vehicle includes an inner lens. The inner lens has an upper half functioning as a reversing lamp for the primary light distribution from a light source to emit light in the forward direction of the lighting device (the backward direction of the vehicle) and a lower half, functioning as a lamp for the secondary light distribution, from which the light emitted from the light source is made to exit in an obliquely downward direction to illuminate the road behind the vehicle. The upper and lower halves of the inner lens, which function as light exits, are wholly exposed at an opening with a predetermined opening width in an extension.

If the light exit for the secondary light distribution is simply disposed, like the above traditional vehicle lighting device, to the light illuminating direction side with respect to the light exit for the primary light distribution, e.g. adjacent to or below the light exit for the primary light distribution as shown in FIG. 5B, such a configuration requires an opening with a large width for exposing both the light exits at the front of the lighting device. In detail, both the upper and lower halves of the inner lens should be exposed at the opening in the extension, despite only the light form the upper half of the inner lens for the primary light distribution is visible in a front view of the lighting device. Such a configuration precludes a reduction in the opening width.

SUMMARY OF THE INVENTION

An object of the present invention, which has been made to solve the above problem, is to provide a vehicle lighting device that illuminates two different directions each other by using a light guiding lens and makes an opening width for exposing a light exit at the front of the lighting device narrower than traditional lighting devices.

In order to realize the above object, according to a first aspect of the present invention, there is provided a vehicle lighting device, including:
a light source; and
a light guiding lens guiding light from the light source to make the light exit from a light exit in a front part thereof, the light exit of the light guiding lens including:
a first light exit surface through which the light is made to exit in a first illuminating direction; and
a second light exit surface disposed adjacent to the first light exit surface in a front view and through which the light is made to exit in a forward direction,
wherein a reflector is disposed in front of the second light exit surface such that the reflector covers the second light exit surface and reflects the light, which is made to exit through the second light exit surface, in a second illuminating direction different from the first illuminating direction.

Preferably, in the vehicle lighting device, the second light exit surface is disposed on one side of the first light exit surface, and the reflector reflects the light which is made to exit through the second light exit surface to the other side of the first light exit surface.

Preferably, in the vehicle lighting device, the reflector is an extension,
the extension including an opening including a shape conforming to the first light exit surface in front view and exposing the first light exit surface in the forward direction,
the extension defining an inner surface of the opening, the inner surface being disposed in front of the second light exit surface, the inner surface reflecting the light which is made to exit through the second light exit surface.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

An embodiment of the present invention will now be described with reference to the accompanying drawings.

Figure 1:
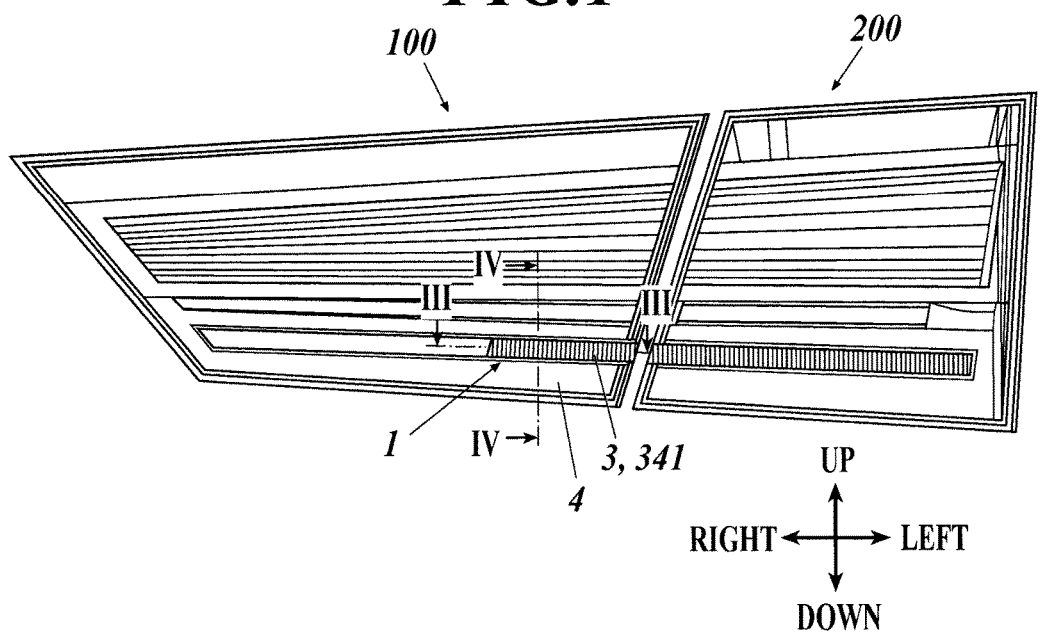
FIG. 1 is a front view of a lid lamp and a rear combination lamp, the lid lamp including a vehicle lighting device according to an embodiment of the present invention.
Figure 2:
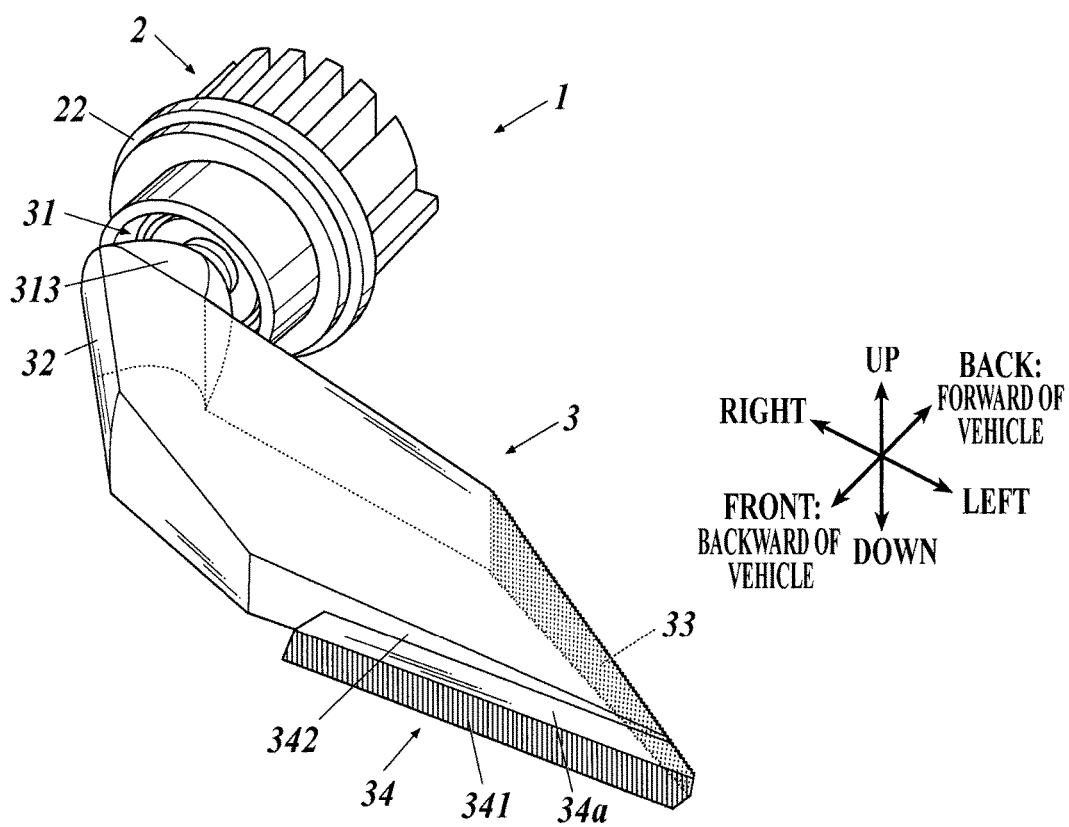
FIG. 2 is a perspective view of a main portion of the lighting device according to the embodiment.
Figure 3:
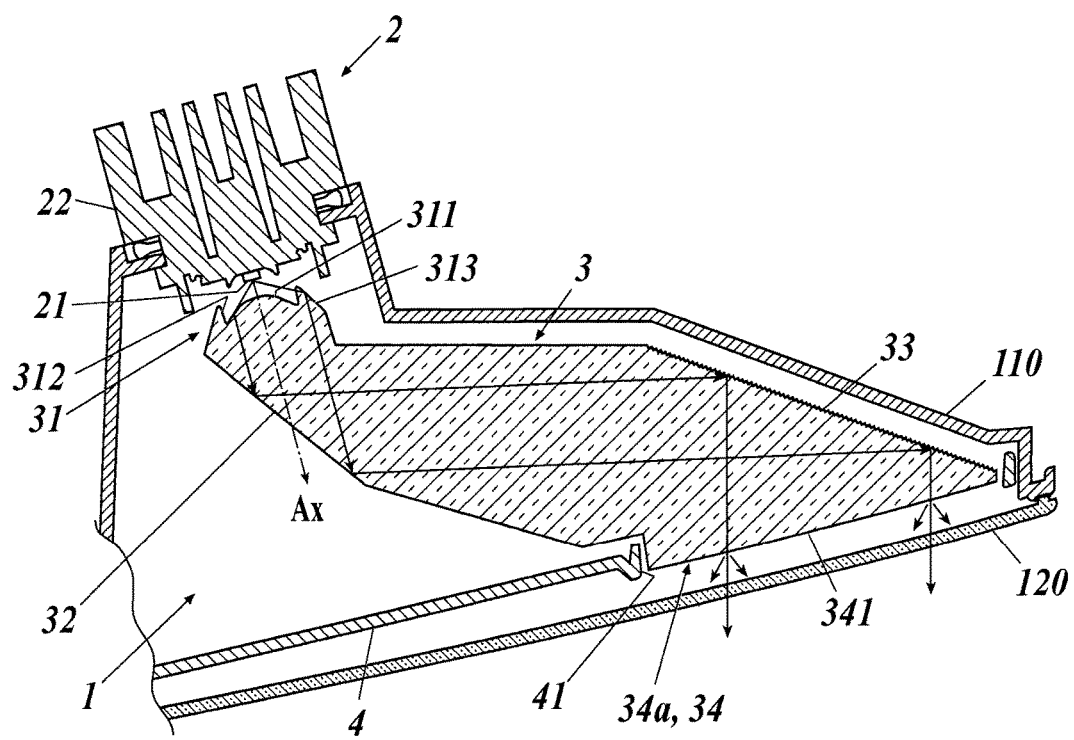
FIG. 3 is a cross-sectional view taken along line III-III of FIG. 1.
Figure 4A:
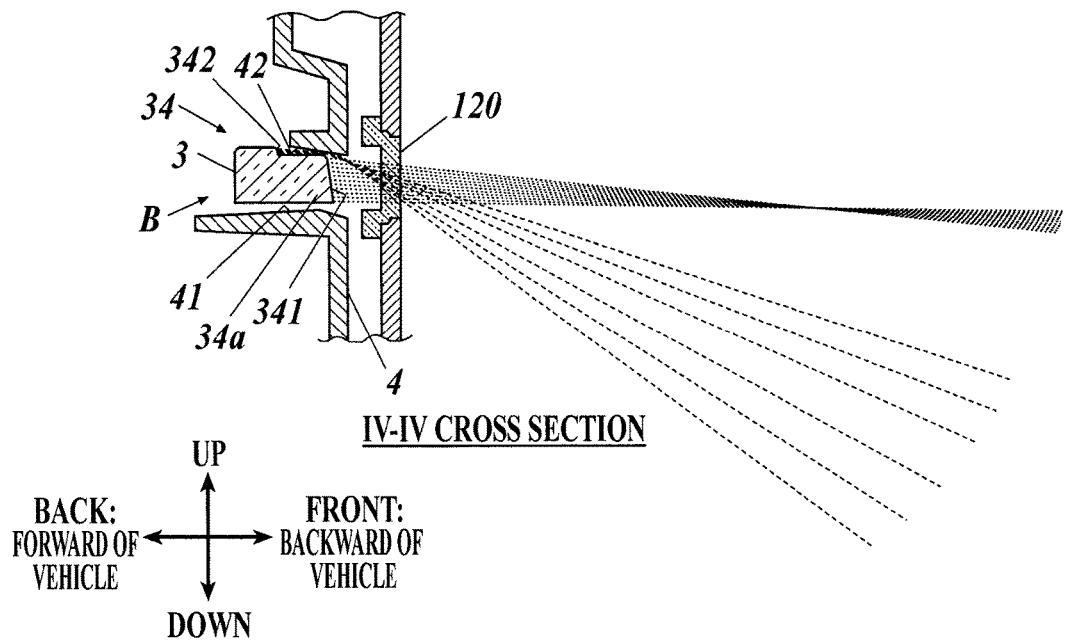
FIG. 4A is a cross-sectional view taken along line IV-IV of FIG. 1.
Figure 4B:
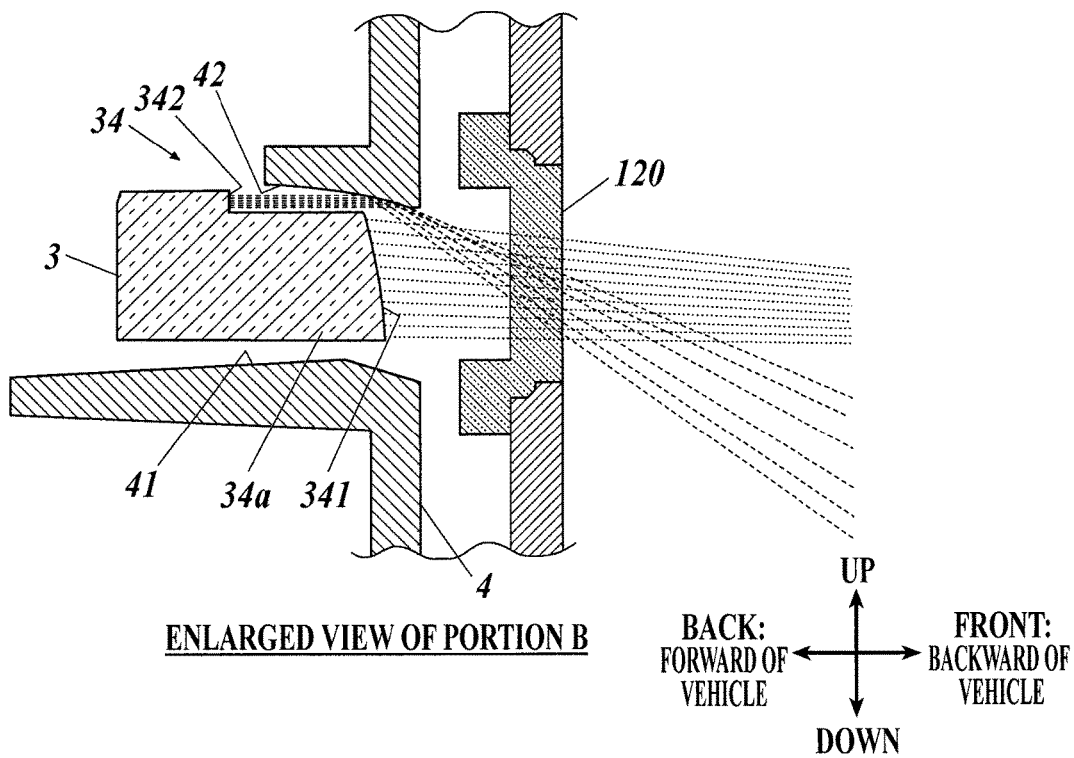
FIG. 4B is an enlarged view of a portion B in FIG. 4A.
Figure 5A:
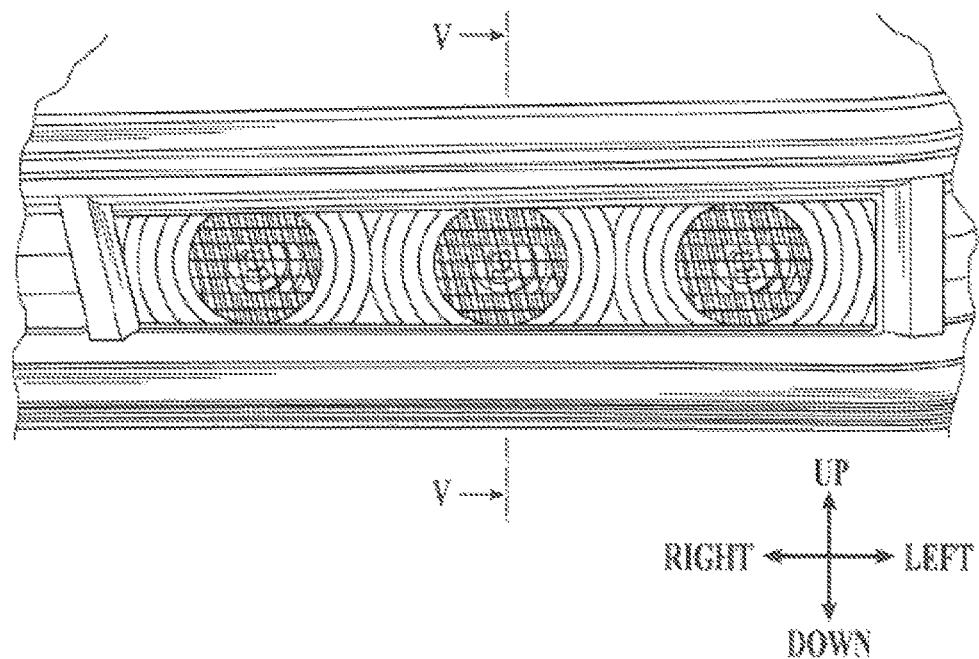
FIG. 5A is a front view of a traditional vehicle lighting device.
Figure 5B:
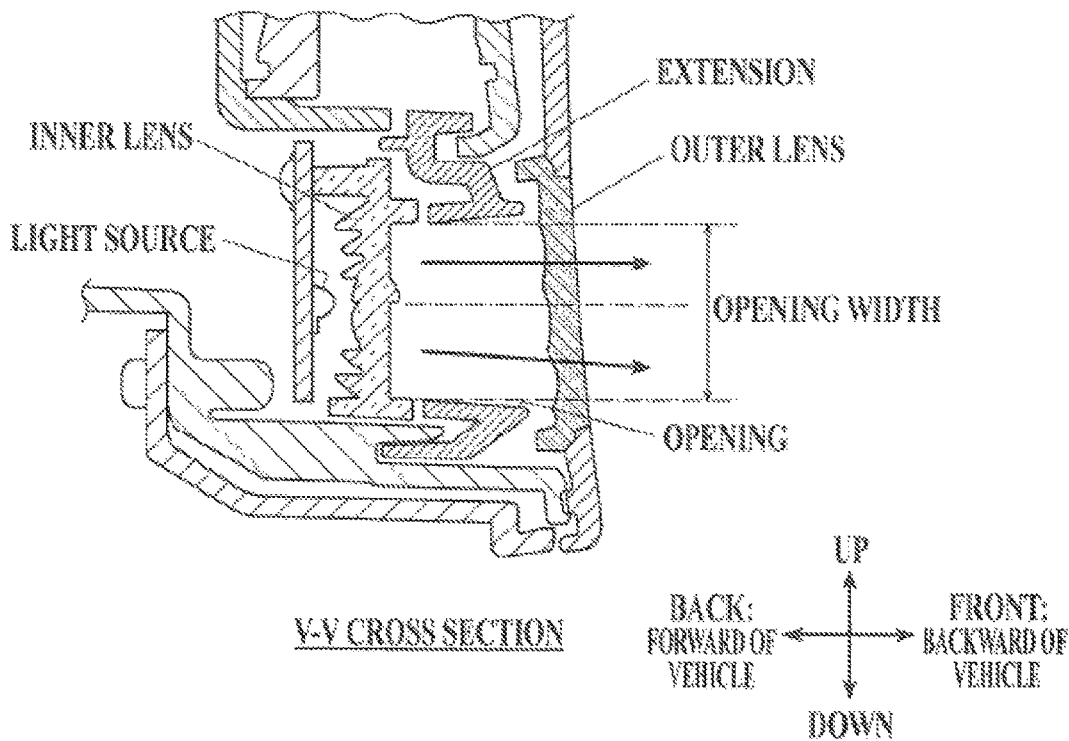
FIG. 5B is a cross-sectional view taken along line V-V of FIG. 5A.

FIG. 1 is a front view of a lid lamp 100 and a rear combination lamp 200. The lid lamp 100 includes a vehicle lighting device 1 according to an embodiment of the present invention. FIG. 2 is a perspective view of a main portion of the vehicle lighting device 1. FIG. 3 is a cross-sectional view taken along line III-III of FIG. 1. FIG. 4A is a cross-sectional view taken along line IV-IV of FIG. 1. FIG. 4B is a magnified view of a portion B in FIG. 4A.

As shown in FIG. 1, the vehicle lighting device 1 is disposed in the lid lamp 100 mounted on a back door (not shown) in the back of the vehicle. When the back door is closed, the lid lamp 100 is disposed side by side with the rear combination lamp 200 mounted on the vehicle body and lights up together with the rear combination lamp 200. In detail, the vehicle lighting device 1 is a back lamp for illuminating the backward direction of the vehicle. In this embodiment, the vehicle lighting device 1 functions not only as a reversing lamp but also as an illuminating lamp for a rear view camera with which a driver in the driver seat monitors the backward direction of the vehicle.

In the following descriptions, "front or forward", "back or backward", "left or leftward", "right or rightward", "upper or upward", and "lower or downward" correspond to the directions viewed from the vehicle lighting device 1 under the condition that the main light illuminating direction is defined as the forward direction (these directions are thus opposite to the forward, backward, left and right directions viewed from the vehicle itself (not shown) on which the vehicle lighting device 1 is mounted) unless otherwise specified.

In detail, as shown in FIGS. 2 and 3, the vehicle lighting device 1 is accommodated in a lower left space in the lighting room defined by a housing 110 for the lid lamp 100 and an outer lens 120 covering the front of the housing 110. The vehicle lighting device 1 includes a light-emitting diode (LED) unit 2, an inner lens 3, and an extension 4.

The LED unit 2 is a socket with a coupler, which is called a direct coupler socket (DICS), and includes an LED 21 on the front face of a socket main body 22. The LED 21 has an optical axis Ax directed in a forward and slightly leftward direction and emits white light in a substantially radial direction around the optical axis Ax.

The inner lens 3 is disposed in front of the LED unit 2 and, while guiding the light from the LED 21, makes the light exit forward. In detail, the inner lens 3 is formed into an elongated and substantially flat plate extending horizontally. The inner lens 3 has a right end disposed in front of the LED unit 2 and is disposed so as to extend therefrom toward the left end of the lid lamp 100.

The inner lens 3 has a light entrance 31 provided in a projecting manner on the back face of the right end in front of the LED 21. The light entrance 31 leads the light emitted from the LED 21 into the inner lens 3.

The light entrance 31 has a backwardly projecting and axially symmetric shape about the rotation axis corresponding to the optical axis Ax of the LED 21.

The light entrance 31 has a first light incident surface 311 which is convex (aspherical) and protruding backward in the center of the back face. The first light incident surface 311 is disposed such that the LED 21 is positioned in the vicinity of the focus of the first light incident surface 311. The first light incident surface 311 receives the light emitted from the LED 21 and leads the light into the light entrance 31 while collimating the light substantially parallel to the optical axis Ax.

The light entrance 31 has a circumferential portion around the first light incident surface 311 (remote from the optical axis Ax). The circumferential portion has a substantially truncated cone shape projecting backward and its inner surface functions as a second light incident surface 312. The second light incident surface 312 is a substantially cylindrical surface extending backward from the circumference of the first light incident surface 311. The second light incident surface 312 leads the light emitted from the LED 21 and traveling toward the outside of the first light incident surface 311 into the light entrance 31.

The outer peripheral surface of the light entrance 31 functions as an incident-light reflective surface 313. The incident-light reflective surface 313 has a substantially truncated cone shape obliquely extending from the tip end (the back end) of the second light incident surface 312 toward the front so as to flare outwardly. The incident-light reflective surface 313 internally (totally) reflects the light entering the light entrance 31 through the second light incident surface 312, so that the light is collimated substantially along the optical axis Ax and exits in the forward direction.

This configuration of the light entrance 31 allows the light emitted forward from the LED 21 to enter the inner lens 3 while collimating the light substantially along the optical axis Ax.

The inner lens 3 has a first reflective surface 32 on the right face of the light entrance 31 in the forward direction of the optical axis Ax. The first reflective surface 32 reflects the light from the light entrance 31. The first reflective surface 32 extends obliquely in the left forward direction in a plan view. The first reflective surface 32 internally (totally) reflects the light guided forward from the light entrance 31 substantially along the optical axis Ax, in the leftward direction.

The first reflective surface 32 gently protrudes and is convexly curved in a perpendicular cross section in a plan view (See FIG. 2). This shape is defined by an overall shape of the inner lens 3 having a narrower vertical width toward the left. The first reflective surface 32 internally reflects the light to slightly collect the light vertically according to the shape of the inner lens 3.

The inner lens 3 has a second reflective surface 33 on the back face of the left end disposed leftward from the first reflective surface 32. The second reflective surface 33 reflects the light from the first reflective surface 32. The second reflective surface 33 extends obliquely in the left forward direction. The second reflective surface 33 further internally (totally) reflects the light internally reflected leftward from the first reflective surface 32, in the forward direction. In detail, the second reflective surface 33 has a plurality of lens cuts aligned on the entire surface for internally reflecting the light from the first reflective surface 32 in the forward direction.

Like the first reflective surface 32 as described above, the second reflective surface 33 gently protrudes or is convexly curved in a perpendicular cross section in a plan view, and internally reflects the light to slightly collect the light vertically (not shown).

The inner lens 3 has a light exit 34 at the front left end in front of the second reflective surface 33. The light from the second reflective surface 33 exits from the light exit 34. The light exit 34 has a part, which is lower than an upper end part, that is provided with a projection 34a projecting in the forward direction and extending over the entire right-to-left region. The light exit 34 has a first light exit surface 341 on the front face of the projection 34a and a second light exit surface 342 on the front face of the upper end part that is not projecting.

The first light exit surface 341 has a shape gently convexly curved or slightly downwardly curved in the forward direction, in a substantially right-to-left vertical cross sectional view. The first light exit surface 341 has a plurality of lens cuts horizontally aligned on the entire surface. The first light exit surface 341 makes the portion except for the upper end portion of the light internally reflected forward from the second reflective surface 33 exit in the forward direction while horizontally diffusing the light through the plurality of lens cuts and slightly collecting the light vertically.

The second light exit surface 342 is adjacent to the first light exit surface 341 in a front view and makes the upper end portion of the light internally reflected forward from the second reflective surface 33 directly exit in the forward direction.

The extension 4 is disposed in front of the LED unit 2 and the inner lens 3 and covers the inner lens 3 except for the first light exit surface 341. In detail, the extension 4 has an opening 41 with a shape conforming to the projection 34a (the first light exit surface 341) of the inner lens 3 in a front view. The extension 4 receives the projection 34a of the inner lens 3 inserted from the back in the opening 41 and exposes the first light exit surface 341 on the front face of the projection 34a in the forward direction.

As shown in FIGS. 4A and 4B, the upper inner surface of the extension 4 at the opening 41 is an exiting-light reflective surface 42 having an aluminum deposited layer. The exiting-light reflective surface 42 is disposed in front of the second light exit surface 342 to cover the second light exit surface 342, is concavely curved from the area above the projection 34a to the area in front of the first light exit surface 341, and is downwardly curved toward the front. The exiting-light reflective surface 42 reflects the light which is made to exit forward from the second light exit surface 342 of the inner lens 3, in the forward obliquely downward direction.

As shown in FIG. 3, in the vehicle lighting device 1 with this configuration, the light emitted in a substantially radial direction from the LED 21 of the LED unit 2 is collimated substantially along the optical axis Ax and enters the inner lens 3 through the light entrance 31 in front of the LED 21. After entering the inner lens 3 through the light entrance 31, the light is internally reflected leftward from the first reflective surface 32 in front of the light entrance 31, and then further internally reflected forward from the second reflective surface 33.

As shown in FIGS. 4A and 4B, the portion except for the upper end portion of the light internally reflected forward from the second reflective surface 33 is made to exit from the inner lens 3 in the forward direction (in the backward direction of the vehicle) through the first light exit surface 341 on the front face of the projection 34a of the light exit 34 while horizontally diffused and slightly collected vertically. The vehicle lighting device 1 functions as a reversing lamp by this light being emitted in this way to meet light distribution requirements of the reversing lamp.

The upper end portion of the light internally reflected forward from the second reflective surface 33 is made to exit forward from the inner lens 3 through the second light exit surface 342 of the light exit 34. The light is then reflected on the exiting-light reflective surface 42 of the extension 4 in front of the second light exit surface 342, in the forward obliquely downward direction (in the backward obliquely downward direction of the vehicle). The vehicle lighting device 1 thereby illuminates the road in a predetermined area behind the vehicle, functioning as an illuminating lamp for a rear view camera for back monitoring.

As described above, according to the vehicle lighting device 1 of this embodiment light is made to exit in the forward direction through the first light exit surface 341 of the light exit 34 of the inner lens 3 and through the second light exit surface 342 adjacent to the first light exit surface 341 in a front view. The light which is made to exit through the second light exit surface 342 is then reflected on the exiting-light reflective surface 42 of the extension 4 covering the front of the second light exit surface 342, in the forward obliquely downward direction.

While the extension 4 covers the front of the second light exit surface 342 and exposes only the first light exit surface 341, the vehicle lighting device 1 can illuminate two directions, i.e., the forward direction and the forward obliquely downward direction. Compared to the traditional vehicle lighting device exposing both the two light exits from which light is made to exit to illuminate two different directions separately, the vehicle lighting device 1 has an opening (the opening 41 in the extension 4) with a narrower vertical width in which the light exit 34 is exposed in the forward direction. Accordingly, the light exit 34 can be designed to have an appearance having an elongated linear shape.

The present invention can have any embodiment other than the above embodiment and can appropriately be modified within the scope of the present invention.

In the above embodiment, the front of the second light exit surface 342 of the inner lens 3 is covered with the extension 4 (the exiting-light reflective surface 42); however, the front of the second light exit surface 342 may be covered with any reflector that covers the front of the second light exit surface 342 and reflects the light which is made to exit from the second light exit surface 342. The extension 4 may be replaced with a dedicated reflector or an outer lens, for example.

The light illuminating direction through the first light exit surface 341 of the inner lens 3 and that from the exiting-light reflective surface 42 of the extension 4 are not limited to the forward direction and the forward obliquely downward direction, but may be any two different directions each other.

In the case where the second light exit surface 342 of the inner lens 3 is disposed on one side of the light exit 34, the reflector for reflecting the light from the second light exit surface 342 should preferably reflect the light to the other side opposite to the one side on which the light exit 34 is disposed.

In the above embodiment, the exiting-light reflective surface 42 of the extension 4 has an aluminum deposited layer thereon; however, the exiting-light reflective surface 42 may be a white surface, for example, for appropriately controlling the reflectivity and directivity.

In the above embodiment, the vehicle lighting device 1 is applied to a back lamp. The vehicle lighting device of the present invention may also be appropriately applied to any lighting system that illuminates two different directions with a light guiding lens, besides a back lamp.

What is claimed is:

1. A vehicle lighting device, comprising:
   a light source; and
   a light guiding lens which guides light from the light source to output the light from a light exit arranged in a front part thereof; and
   an extension,
   wherein the light source, the light guiding lens, and the extension are arranged in a lighting room defined by a housing and an outer lens covering a front part of the housing,
   wherein the light guiding lens includes a light incident surface facing the light source, and a reflective surface which internally reflects the light incident in the light guiding lens from the light source,
   wherein the light exit includes a first light exit surface through which the light exits in a first illuminating direction, and a second light exit surface, arranged adjacent to and above the first light exit surface in a front view, through which the light exits in a forward direction, the first light exit surface being projected relative to the second light exit surface in the forward direction, wherein the extension is arranged between the light source and the outer lens and has an opening formed to uncover the first light exit surface in the front view, wherein the light guiding lens is arranged in the opening such that the first light exit surface is uncovered in the forward direction, wherein the extension has an upper part and a lower part, the upper part being arranged in a front of the second light exit surface and including a tilted reflection surface which has a part extending and tilting downward over the first light exit surface, the lower part being arranged below the first light exit surface, and wherein the tilted reflection surface reflects the light output from the second light exit surface in a second illuminating direction different from the first illuminating direction, the second illuminating direction being in a forward, obliquely-downward direction.

2. The vehicle lighting device according to claim 1, wherein the opening and the first light exit surface are formed in a horizontally-elongated shape.

3. The vehicle lighting device according to claim 2, wherein the opening is formed to conform with a contour of the first light exit surface, and wherein the second light exit surface is covered with the tilted reflection surface.

4. The vehicle lighting device according to claim 3, wherein the light source is an LED.

5. The vehicle lighting device according to claim 4, wherein the light source is a white LED, and wherein the vehicle lighting device is a back lamp.

6. The vehicle lighting device according to claim 5, wherein the tilted reflection surface is formed by white material or material on which a reflection layer is formed.

7. The vehicle lighting device according to claim 4, wherein the light source is arranged at a distance from a periphery of the opening, and wherein a reflection surface of the light guiding lens is positioned in a rear of the first light exit surface and the second light exit surface.

8. The vehicle lighting device according to claim 2, wherein the light source is an LED.

9. The vehicle lighting device according to claim 8, wherein the light source is a white LED, and wherein the vehicle lighting device is a back lamp.

10. The vehicle lighting device according to claim 9, wherein the tilted reflection surface is formed by white material or material on which a reflection layer is formed.

11. The vehicle lighting device according to claim 8, wherein the light source is arranged at a distance from a periphery of the opening, and wherein a reflection surface of the light guiding lens is positioned in a rear of the first light exit surface and the second light exit surface.

12. The vehicle lighting device according to claim 1, wherein the light source is an LED.

13. The vehicle lighting device according to claim 12, wherein the light source is a white LED, and wherein the vehicle lighting device is a back lamp.

14. The vehicle lighting device according to claim 13, wherein the tilted reflection surface is formed by white material or material on which a reflection layer is formed.

15. The vehicle lighting device according to claim 12, wherein the light source is arranged at a distance from a periphery of the opening, and wherein a reflection surface of the light guiding lens is positioned in a rear of the first light exit surface and the second light exit surface.

16. A vehicle lighting device provided in a rear of a vehicle, comprising:

a light source;

a light guiding lens which guides light from the light source to output the light from a light exit arranged in a front part thereof; and an extension, wherein the light source, the light guiding lens, and the extension are arranged in a lighting room defined by a housing and an outer lens covering a front part of the housing, wherein the light guiding lens includes a light incident surface facing the light source, and a reflective surface which internally reflects the light incident in the light guiding lens from the light source, the light guiding lens as a whole is formed in a plate-like shape, wherein the light exit includes a first light exit surface through which the light exits in a first illuminating direction, and a second light exit surface, arranged adjacent to and above the first light exit surface in a front view, through which the light exits in a forward direction, the first light exit surface being projected relative to the second light exit surface in the forward direction, wherein a plurality of lens cuts are formed on the first light exit surface and diffuse the light in a horizontal direction, wherein the extension is arranged between the light source and the outer lens and has an opening formed to conform with a contour of the first light exit surface in the front view, wherein the light guiding lens is arranged in the opening such that the first light exit surface is uncovered in the forward direction, wherein the extension has an upper part and a lower part, the upper part being arranged in a front of the second light exit surface and including a tilted reflection surface which has a part extending and tilting downward over the first light exit surface, the lower part being arranged below the first light exit surface, wherein the tilted reflection surface reflects the light output from the second light exit surface in a second illuminating direction different from the first illuminating direction, the second illuminating direction being in a forward, obliquely-downward direction, and wherein an edge part of the tilted reflection surface is positioned between the first light exit surface and the outer lens.

* * * * *